J. J. HEILMANN.
COMPOUND SPRING SUSPENSION FOR VEHICLES.
APPLICATION FILED AUG. 4, 1908.
1,001,394.
Patented Aug. 22, 1911.
6 SHEETS—SHEET 1.
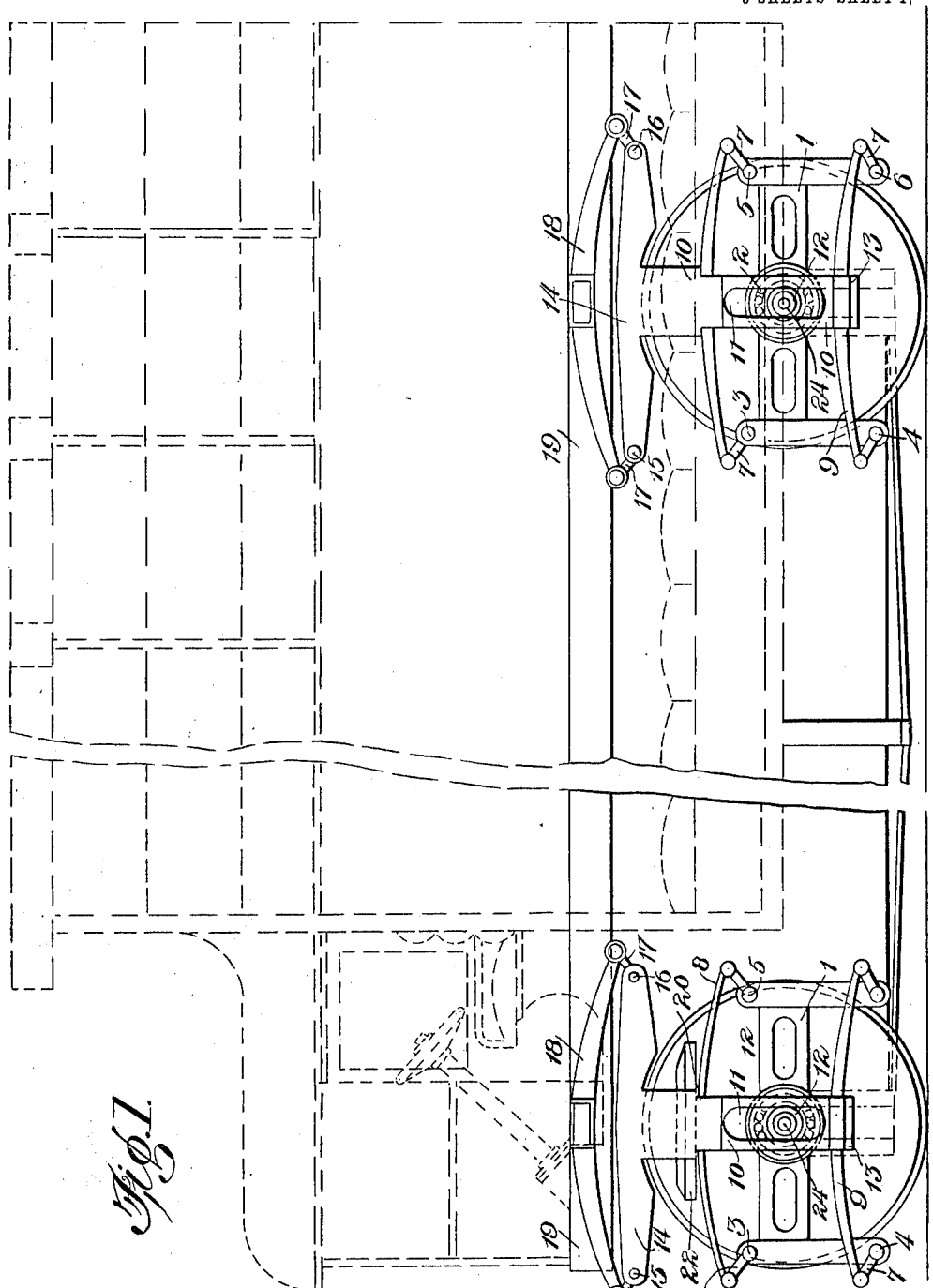

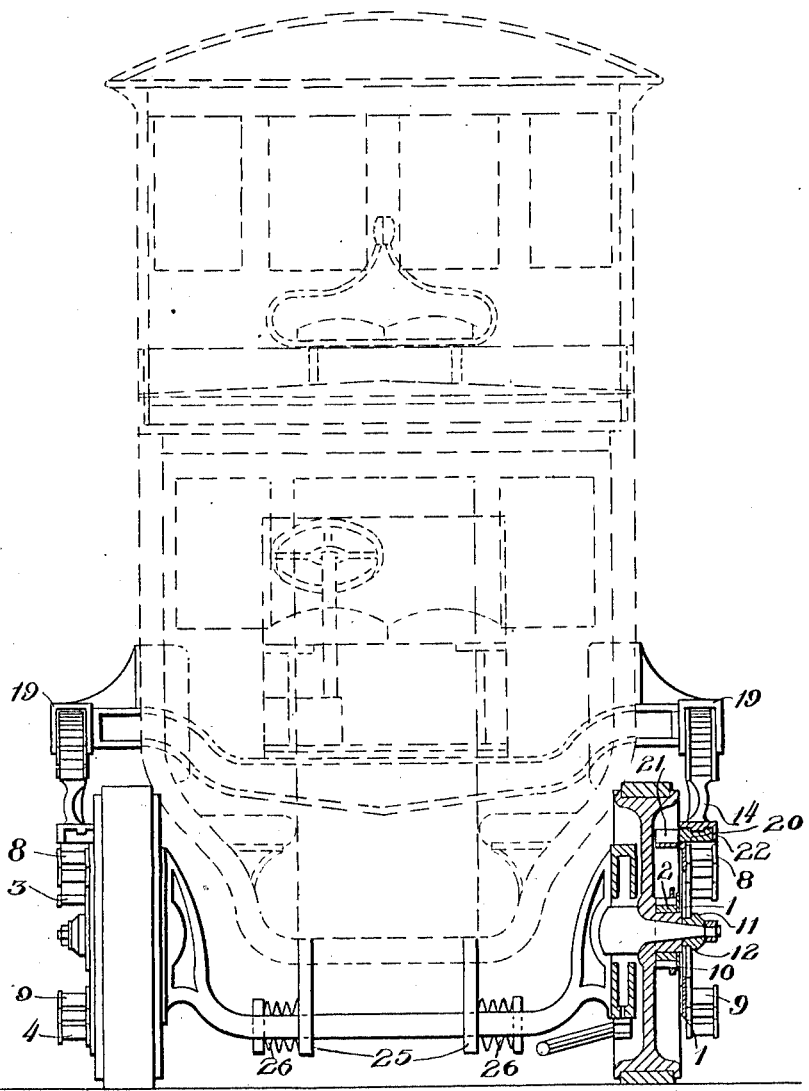

J. J. HEILMANN.
COMPOUND SPRING SUSPENSION FOR VEHICLES.
APPLICATION FILED AUG. 4, 1908.
1,001,394.
Patented Aug. 22, 1911.
6 SHEETS—SHEET 3.
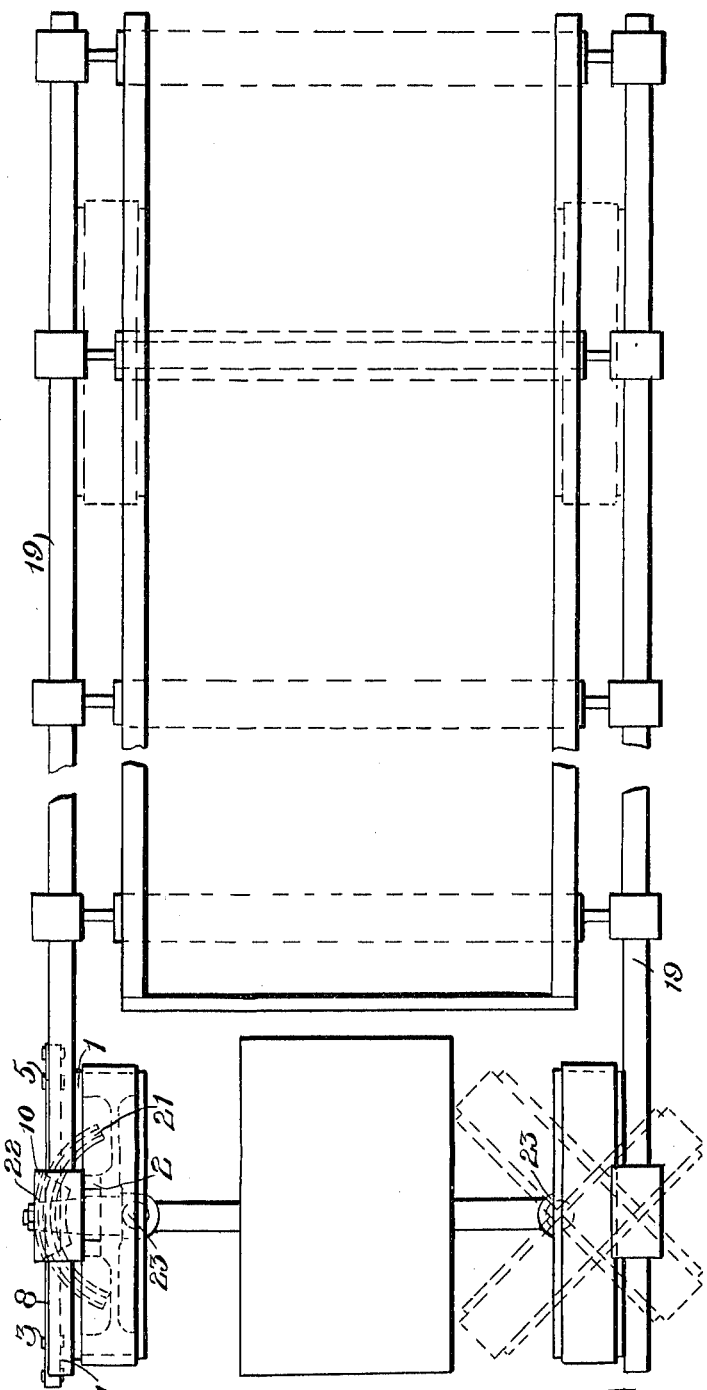
Witnesses:
Chas P Hidden
Waldo M Chapin
Inventor:
Jean Jacques Heilmann

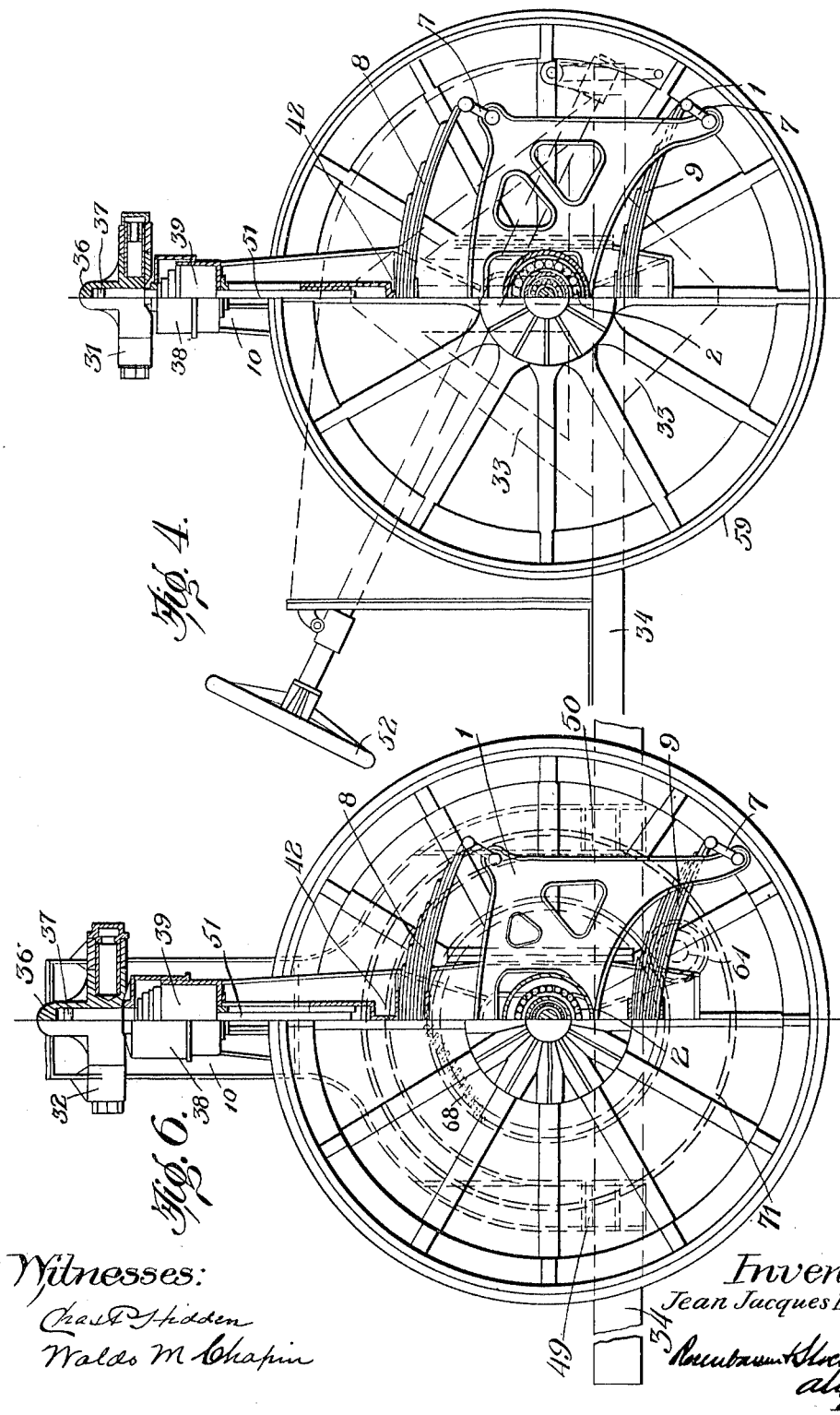

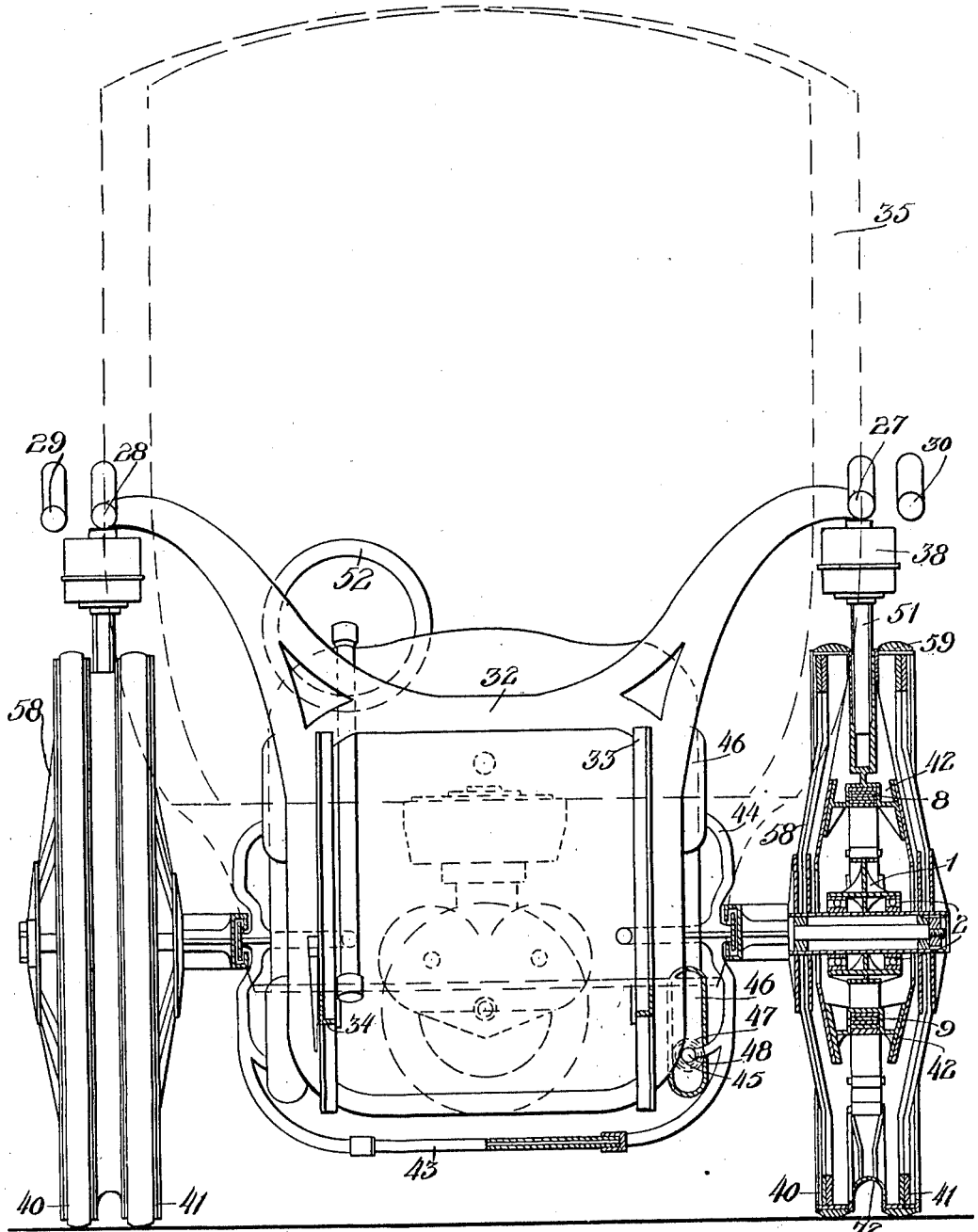

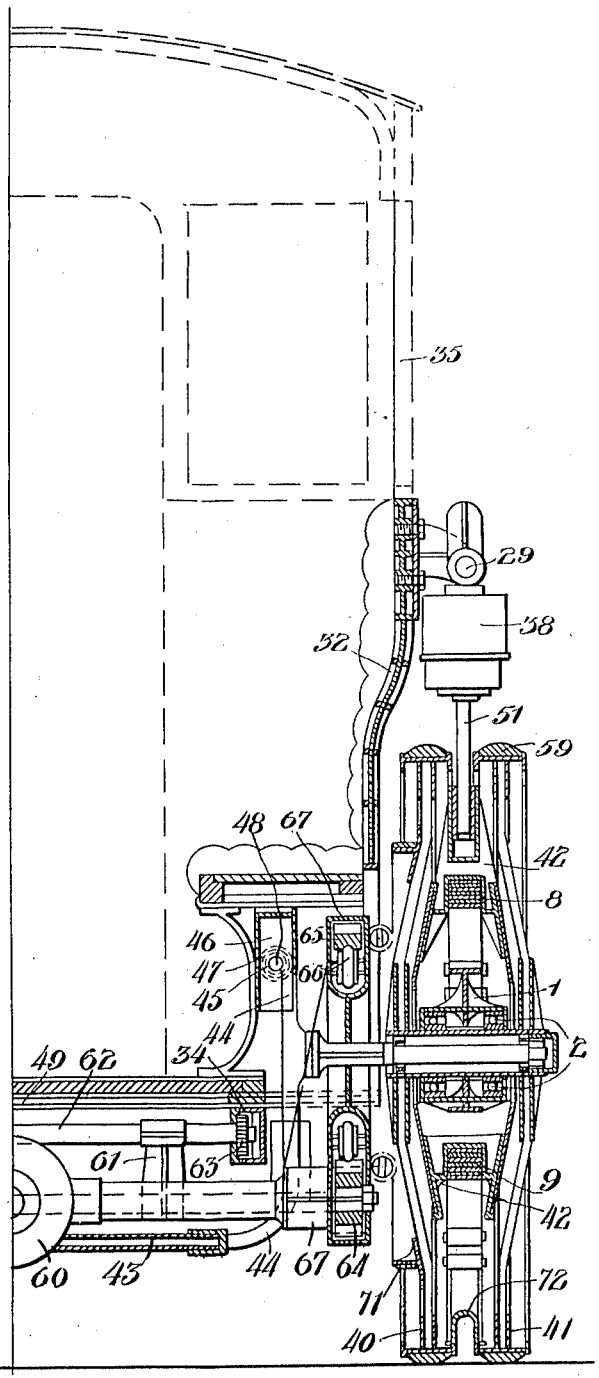

UNITED STATES PATENT OFFICE.

JEAN JACQUES HEILMANN, OF PARIS, FRANCE.

COMPOUND SPRING SUSPENSION FOR VEHICLES.

1,001,394.   Specification of Letters Patent.   Patented Aug. 22, 1911.

Application filed August 4, 1908.   Serial No. 446,869.

*To all whom it may concern:*

Be it known that I, JEAN JACQUES HEILMANN, a citizen of the French Republic, residing at Paris, in the Department of the Seine, France, have invented certain new and useful Improvements in Compound Spring Suspensions for Vehicles, of which the following is a specification.

The present invention is for the purpose of realizing the problem of a rational suspension and its principle consists in interposing between the carriage body of the vehicle and the parts in contact with the ground, a compound balanced automatic suspension, which prevents the effects of shocks resulting from inequalities in the planes over which the vehicles are traveling, from being perceived.

The figures of the drawing accompanying this description are for the purpose of showing, for the sake of example, how the principle of this system of balanced compound suspension can be applied to any vehicles whatsoever. Furthermore, some of the figures are for the purpose of showing the modification brought into the principal parts as well as certain details, because it is very evident that with this system of compound suspension, based on a principle at present unknown, the principal known parts no longer correspond.

The said improvement refers principally to the steering, to the axles connecting the wheels, as well as the journals of the steering wheels, and to the connection between the gear-wheel and the rotary parts to which power is applied.

Figures 1, 2 and 3 show such a system of suspension with the most simplified form of construction of this arrangement, and one which is more particularly adapted for heavy weights on rails or on roads; in these figures, this system of suspension is shown as applied to a motor omnibus, in which Fig. 1 is a side elevation showing the back and the front suspension. Fig. 2 shows a partial sectional elevation looking at the front of the vehicle end on. Fig. 3 is a plan view showing the arrangement of the frame plates, its flanks supporting the body of the vehicle as well as the arrangement for steering the wheels. The Figs. 4, 5, 6 and 7 show the same system of suspension with certain modifications in the construction. Referring to these figures: Fig. 4 is a side elevation showing the steering wheel partly in section. Fig. 5 is a front view in sectional elevation. Fig. 6 is a side elevation showing the back wheel in partial section. Fig. 7 is a front sectional view of one half of the back.

It is evident that the only object of all these figures is to show for the sake of example some arrangements assisting in the material realization of the principle of balanced compound suspension, forming the object of the present invention, as well as for all the modifications or details of the various parts, such as the steering, the actuating or other parts, and that all other arrangements, modifications or details suitable for assisting in the realization of the principle of this system of suspension, will in no way modify the principle itself.

Referring to Figs. 1, 2 and 3, 1 is a steel cross bar supported in the center by a collar forming part of a ball bearing 2 later referred to. The hub is mounted in the said collar either in a bearing of suitable metal or on balls or on rollers, or in any other kind of bearing which by its construction reduces to a minimum the co-efficient of resistance to the rotary effort of the wheel. This cross bar carries at each of its ends 3, 4, 5, 6 suspension links 7, pivoted to the ends of the compound springs 8 and 9. These springs 8 and 9 are attached by their middle portion to a movable vertical support 10. This support 10 has a vertical slot longer than the maximum flexion of the springs. The vertical displacement of the slide support 10, is effected along the hub of the wheels in which a groove 12 is turned for this purpose. The slot of the support 10 is open at the bottom so as to permit of its being mounted on the hub but after mounting is closed by a head 13, carrying the fixing socket of the lower compound spring 9. The vertical support 10 terminates at its upper portion 14 in the form of a T. At the ends 15, 16, of this part of the support are arranged the suspension links 17, pivoted to the ends of the main springs 18 fitted either in a frame plate 19, carrying the vehicle or in a suitable support fitted to the body or the chassis of the vehicle. The arrangement of the front wheels differs from the arrangement of the back wheels in this respect that above the point 20 where the vertical support 10 carrying the compound springs 8 and 9 attached by their middle, takes its form of T, this support is divided into two parts sliding the one on the other by means of sectors 21 and 22. These two sectors are hooked the one in the other and follow an arc of a circle having its pivoting center in the axis of the pivot controlling the steering of the wheels 23. As the wheels have to be turned carrying on them the cross piece 1 to which are attached the ends of the springs 8 and 9, during the turning of the wheels they cause the whole of this first part of the compound suspension to pivot with them; all the upper part remaining parallel to the body or the chassis of the vehicle without, however, preventing the vertical support 10 from sliding along the hub during the working of the suspension.

On the wheel receiving a shock, the effects will be directly transmitted from the fellies and from the body of the wheel to the hub 24 and from the said hub to the cross piece 1 carrying the ends of the compound springs 8 and 9. The displacement of the center of this cross piece 1 will then be the same as that of the center of the hub 24, the shocks will be supported by the suspension links 7 pivoted at 3, 4, 5 and 6. If on the contrary the springs were attached by the middle to the body or any other part of the vehicle, the effects endured resulting from the shocks would be undoubtedly transmitted with the attenuation of the springs in the same manner as occurs to-day; but inasmuch as the springs are attached by their middle to a movable support and this support slides along the hub, the vibration is absorbed in a plunge which the vertical support makes at each vibration; what still remains of the effects produced by the shocks is attenuated a second time, the vertical support being connected by its upper end to the vehicle or to the chassis by means of a second suspension which is rigidly attached at its center to the vehicle and is connected by suspension links 17 to the arm of the said movable vertical support 1.

The balancing or rolling of the vehicles is maintained by means of movable forks 25 on the axles, the lateral movements of these forks being checked by buffer springs 26. These forks at the same time serve to prevent the axles, which have no load to support, from turning on themselves.

From what has been said it will be seen that the distribution of the load of the vehicle is such that it is carried exactly on four points respectively passing through the four hubs of the wheels. In the arrangement of balanced compound suspension shown in Figs. 4, 5, 6 and 7, these four points are always present on the four wheels, but they are so arranged that the compound suspension for each wheel works in a vertical plane passing through the middle of its hub. These four points for distributing the load are shown at 27, 28, 29 and 30. These four points form hinge joints. The female portion 31 of these hinge joints is fitted to a support 32 rigidly carried by gussets 33 on the chassis 34 which carries the mechanism of the body 35. The male portion 36 in the form of a cross carries the weight of the vehicle on sockets 37, to the lower part of which are attached a kind of cap 38 substituted for the upper portion 14 in the form of T, of the vertical support 10 and transmit the weight of the vehicle on the single compensating springs 39 which are here substituted for the main springs 18 of the first arrangement. These compensating springs are fixed by their bases on vertical supports 10, which latter, as may be seen by reference to the figures, are also modified. The wheels are also modified, and consist of two plates 40 and 41 mounted parallel and connected together in any suitable manner on the same hub, leaving between them a free space in which the whole of the suspension is located. The vertical support 10 slides along the hub. Fitted to this support, above and below this hub are the sockets 42, of the springs 8 and 9 of the compound suspension, the ends of which are pivoted by intermediary links 7 to the cross bar 1 carried on the ball bearing 2. The sockets 42 of the springs 8 and 9 also serve as stays for the vertical support 10. The wheels are tied by their axles 43 which no longer have any load to support. These axles are prolonged upwardly and downwardly by engaging arms or bars 44, which terminate in the form of disks 45 in the small boxes 46 where they can move so as to permit the chassis and the wheels to follow independently the different movements and undulations of the vehicle when traveling. These disks 45 are surrounded by springs 47 so as to check their contact with the walls of the small boxes 46, which are fitted to the body of the vehicle. With the same object in view the ends of the lugs 44 may be provided with one or more balls 48 of suitable dimensions, incased or maintained in any other suitable manner in the said extremities. At the back the support 32 follows the shape of the body 35 and then separates into two parts. The two supports 32 on opposite sides of the vehicle are connected together by ties 49 and 50 to which the chassis 34 carrying the mechanism on the body of the vehicle is attached. The socket 37 is prolonged in the form of a rod 51 which, attached to the support 36 and passing through the spring 39 as well as the vertical support 10, serves as a guide to the various parts and imparts considerable rigidity to the suspension compensating mechanism. This socket 37 also serves as pivoting center of the steering wheels.

The flanges 58 of the plates 40 and 41 are surrounded by a noise-silencer 59 of leather, compressed india-rubber or the like. The compound suspension arranged in the manner just described absorbs the vibrations of the rods and prevents them reaching the body, the chassis and the mechanism of the vehicle. In these improvements the differential 60 is carried by a small chassis consisting of the supports 61 and the ties 62. The ends of these ties 62 are provided with spiral springs 63 or some other buffer, india-rubber, pneumatic or the like which are embedded in the profile of the chassis 34, and serve for elastically suspending the differential 60 to the vehicle. The pinions 64 of the differential 60 mesh externally with toothed ring 65, which turns internally on rollers 66, mounted or not on ball bearings, which are inclosed in the carter or envelop 67. The space between the respective plates 40 and 41 of each wheel may be covered by inserting a trough shaped band or gutter 72 therebetween, such trough being secured to the support 1.

Having now particularly described and ascertained the nature of my said invention, I declare that what I claim is:

1. In a compound spring suspension for vehicles, a wheel having a hub with a bearing portion in the plane of the tread thereof, a frame having a journal for said bearing, springs supported by said frame, intermediate means in engagement with said springs and guided to have a vertical movement on the hub of said wheel, and springs attached to the vehicle and supported by said intermediate means.

2. In a compound spring suspension for vehicles, a wheel having a hub with a bearing portion in the plane of the tread thereof, a frame having a journal for said bearing, springs supported by said frame, intermediate means in engagement with said springs and guided to have a vertical movement on the hub of said wheel, springs attached to the vehicle and supported by said intermediate means, and a floating axle joining said wheel to the body of the vehicle.

3. In a compound spring suspension for vehicles, a wheel having a dished outside face and a hub with a bearing portion thereon, a frame within the dished portion of said wheel having a journal for the bearing portion of said hub, means guided on said hub to have a vertical movement within the dished portion of said wheel, springs joining said means and said frame, and springs for supporting the body of the vehicle from said means.

4. In a compound spring suspension for vehicles, a wheel having a dished outside face and a hub with a bearing portion thereon, a frame within the dished portion of said wheel having a journal for the bearing portion of said hub, means guided on said hub to have a vertical movement within the dished portion of said wheel, springs joining said means and said frame, and a pivot support for said means to permit the wheel to be deflected on a vertical axis extending through the bearing portion of said hub.

5. In a compound spring suspension for vehicles, a wheel having a dished outside face and a hub with a bearing portion thereon, a frame within the dished portion of said wheel having a journal for the bearing portion of said hub, means guided on said hub to have a vertical movement within the dished portion of said wheel, springs joining said means and said frame, a pivot support for said means to permit the wheel to be deflected on a vertical axis extending through the bearing portion of said hub, and a floating axle for guiding said wheel from the frame of the vehicle.

6. In a compound spring suspension for vehicles, a pair of wheels, an axle joining said wheels, a vehicle body having means for guiding said axle to have a free independent vertical movement, said wheels having hubs with bearing portions in the planes of the treads thereof, frames having journals engaging the bearing portions of said wheels, and spring means for supporting the body of the vehicle from said frame.

7. In a compound spring suspension for vehicles, a wheel having a hub with a bearing portion, a frame having a journal for said bearing portion, a structure movable on said hub substantially vertically, a pair of springs co-acting with said frame and structure, a spring for supporting the body of said vehicle, and means for connecting said spring with said structure.

8. In a resilient suspension for vehicle bodies, a pair of wheels having hubs with load-carrying bearing portions, an axle joining said wheels, frames having journals engaging such bearing portions, resiliently mounted structures movable in guided relationship to said frames, and flexible connections between said frames and said structures.

In testimony whereof I affix my signature in presence of two witnesses.

JEAN JACQUES HEILMANN.

Witnesses:
 H. C. COXE,
 HENRY DANBERG.